(12) United States Patent
Lee

(10) Patent No.: US 10,900,546 B2
(45) Date of Patent: Jan. 26, 2021

(54) ACTUATOR

(71) Applicant: MANDO CORPORATION, Gyeonggi-do (KR)

(72) Inventor: Jae-Hyun Lee, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 324 days.

(21) Appl. No.: 15/925,729

(22) Filed: Mar. 19, 2018

(65) Prior Publication Data

US 2018/0283507 A1    Oct. 4, 2018

(30) Foreign Application Priority Data

Mar. 28, 2017    (KR) .......................... 10-2017-0039382

(51) Int. Cl.
| | |
|---|---|
| *F16H 7/12* | (2006.01) |
| *F16H 7/02* | (2006.01) |
| *F16H 37/04* | (2006.01) |
| *F16H 7/08* | (2006.01) |
| *F16D 65/18* | (2006.01) |

(Continued)

(52) U.S. Cl.
CPC ........... *F16H 7/1281* (2013.01); *F16H 7/023* (2013.01); *F16H 37/041* (2013.01); *B60Y 2306/09* (2013.01); *F16D 65/0006* (2013.01); *F16D 65/18* (2013.01); *F16D 2121/24* (2013.01); *F16D 2125/48* (2013.01); *F16D 2125/50* (2013.01); *F16H 1/46* (2013.01); *F16H 37/02* (2013.01); *F16H 63/3466* (2013.01); *F16H 2007/0804* (2013.01); *F16H 2007/0865* (2013.01); *F16H 2007/0874* (2013.01);

(Continued)

(58) Field of Classification Search
CPC ......... F16H 2007/0874; F16D 2121/24; F16D 2125/50; F16D 65/18; F16D 65/0006
USPC ........................................................ 474/134
See application file for complete search history.

(56) References Cited

U.S. PATENT DOCUMENTS

| | | | | |
|---|---|---|---|---|
| 315,735 | A | * | 4/1885 | Colburn ........................ 474/134 |
| 3,575,058 | A | * | 4/1971 | Kraus ................... F16H 7/1281 |
| | | | | 474/29 |

(Continued)

FOREIGN PATENT DOCUMENTS

| | | |
|---|---|---|
| CN | 101395400 | 3/2009 |
| CN | 106195070 | 12/2016 |

(Continued)

OTHER PUBLICATIONS

Office Action dated Nov. 11, 2019 for German Application No. 10 2018 204 444.9 and its English translation by Google Translate.

(Continued)

*Primary Examiner* — Henry Y Liu
(74) *Attorney, Agent, or Firm* — Ladas & Parry, LLP

(57) ABSTRACT

Disclosed herein is an actuator. The actuator, in accordance with an aspect of the present disclosure, includes a motor configured to generate torque, a gear device configured to amplify the torque, a belt driving device configured to transfer the torque to the gear device, and a bracket unit configured to fix a distance between a rotation shaft of the motor and a gear shaft of the gear device, wherein the bracket unit includes a pair of support members configured to support a portion of an outer peripheral surface of a belt gear in the bracket driving device and prevent tooth disengagement of the belt gear.

18 Claims, 19 Drawing Sheets

(51) Int. Cl.
*F16H 1/46* (2006.01)
*F16D 121/24* (2012.01)
*F16D 125/48* (2012.01)
*F16D 125/50* (2012.01)
*F16D 65/00* (2006.01)
*F16H 63/34* (2006.01)
*F16H 37/02* (2006.01)
*F16H 57/02* (2012.01)

(52) U.S. Cl.
CPC ............... *F16H 2007/0893* (2013.01); *F16H 2007/0897* (2013.01); *F16H 2057/02034* (2013.01)

(56) References Cited

U.S. PATENT DOCUMENTS

| | | | | |
|---|---|---|---|---|
| 3,941,006 | A * | 3/1976 | Brodesser | F16H 7/1254 474/132 |
| 4,564,098 | A * | 1/1986 | Hormann | E05F 15/668 192/150 |
| 4,865,376 | A * | 9/1989 | Leaver | B25J 9/1045 294/111 |
| 4,909,086 | A * | 3/1990 | Kaneko | G01L 5/10 73/862.194 |
| 4,934,989 | A * | 6/1990 | Furukawa | F16H 7/1281 474/135 |
| 5,002,519 | A * | 3/1991 | Oshima | F16H 7/0827 474/134 |
| 5,613,918 | A * | 3/1997 | Fleischman | B62M 9/16 280/237 |
| 5,725,450 | A * | 3/1998 | Huskey | B62M 9/06 474/116 |
| 6,743,131 | B1 * | 6/2004 | Walker | F16H 7/08 474/101 |
| 7,021,415 | B2 * | 4/2006 | Farmer | B60T 13/741 180/275 |
| 7,892,125 | B2 * | 2/2011 | Nelson | F16H 7/1254 474/101 |
| 8,186,488 | B2 * | 5/2012 | Poertzgen | B60T 13/746 188/162 |
| 8,790,208 | B2 * | 7/2014 | Poertzgen | B60T 13/741 475/149 |
| 8,821,328 | B2 * | 9/2014 | Jud | F16H 7/1281 474/134 |
| 9,140,338 | B2 * | 9/2015 | Serkh | F16H 7/1281 |
| 9,447,849 | B1 * | 9/2016 | Edsinger | B25J 9/1045 |
| 9,835,213 | B2 * | 12/2017 | Li | F16D 65/18 |
| 10,088,019 | B2 * | 10/2018 | Al-Hawaj | F16H 7/02 |
| 2003/0089576 | A1 * | 5/2003 | Peter | B60T 7/107 192/219.5 |
| 2004/0178028 | A1 * | 9/2004 | Farmer | F16D 65/0006 188/162 |
| 2005/0098396 | A1 * | 5/2005 | Baumann | F16D 65/18 188/77 W |
| 2006/0258496 | A1 * | 11/2006 | Wang | A61C 5/68 474/101 |
| 2007/0020081 | A1 * | 1/2007 | Gilchrist | B25J 9/10 414/744.5 |
| 2007/0142147 | A1 * | 6/2007 | Thornton | B28D 1/045 474/117 |
| 2008/0070730 | A1 * | 3/2008 | Nelson | F16H 7/1254 474/134 |
| 2008/0293534 | A1 * | 11/2008 | Dettenberger | H02K 7/116 475/154 |
| 2009/0050420 | A1 * | 2/2009 | Poertzgen | B60T 13/746 188/156 |
| 2012/0325601 | A1 * | 12/2012 | Giering | F16D 65/0006 188/162 |
| 2013/0150192 | A1 * | 6/2013 | Cholewczynski | F16H 7/08 474/111 |
| 2016/0025193 | A1 * | 1/2016 | Wheatley | F16H 7/1281 241/101.71 |
| 2016/0146312 | A1 * | 5/2016 | Pfeifer | F16H 7/08 474/135 |
| 2016/0223040 | A1 * | 8/2016 | Watzek | F16D 65/18 |
| 2016/0327104 | A1 * | 11/2016 | Li | F16D 65/0006 |
| 2016/0368139 | A1 | 12/2016 | Edsinger et al. | |
| 2017/0204944 | A1 * | 7/2017 | Holzberger | F16H 25/2204 |
| 2018/0019638 | A1 * | 1/2018 | Ben-Omrane | H02K 7/083 |
| 2018/0355955 | A1 * | 12/2018 | Lee | F02B 67/06 |
| 2019/0120345 | A1 * | 4/2019 | Pfeifer | F16H 7/1281 |

FOREIGN PATENT DOCUMENTS

| | | |
|---|---|---|
| CN | 106402302 | 2/2017 |
| CN | 106468235 | 3/2017 |
| DE | 10 2016 108 277 | 11/2016 |

OTHER PUBLICATIONS

Office Action dated Jun. 24, 2019 for Chinese Application No. 201810259662.9 and its English translation from Global Dossier.

* cited by examiner

# ACTUATOR

CROSS-REFERENCE TO RELATED APPLICATION

This application claims the benefit of Korean Patent Application No. 2017-0039382, filed on Mar. 28, 2017 in the Korean Intellectual Property Office, the disclosure of which is incorporated herein by reference.

BACKGROUND

1. Field

Embodiments of the present disclosure relate to an actuator, and more particularly, to an actuator used in an electronic parking brake for a vehicle.

2. Description of the Related Art

Generally, an actuator is a conversion device that receives electrical energy, hydraulic energy, pneumatic energy, or the like to output mechanical power. That is, the actuator is used to generate driving power using a motor and amplify and transfer the generated driving power to mechanically operating components. The actuator is mounted, for example, on an ordinary disc brake to function as a parking brake.

More specifically, the actuator transfers torque to a deceleration gear unit configured to amplify driving power of a motor, through a means such as a worm and worm-wheel gear assembly configuration, a spur gear assembly configuration, or a belt gear (chain sprocket) connection configuration. Here, when the torque is transferred through a belt gear, the torque is transferred in a state in which the belt gear is coupled to surround a driving gear coupled to a rotation shaft of the motor and a driven gear coupled to the deceleration gear unit. That is, as the belt gear is engaged with the driving gear and the driven gear, the torque of the driving gear is transferred to the driven gear through the belt gear.

However, as described above, when power is transferred to generate a parking force in a configuration in which power is transferred through the belt gear, tooth disengagement between the belt gear and the driving gear or between the belt gear and the driven gear may occur as belt gear tension is changed by a load generated when a parking brake is operated.

In addition, vibration caused by operation of the deceleration gear unit may be transferred to an actuator housing to generate noise.

SUMMARY

Therefore, it is an aspect of the present disclosure to provide an actuator capable of preventing tooth disengagement between a belt gear and a driving gear as well as reducing vibration and noise when a parking brake is operated.

Additional aspects of the disclosure will be set forth in part in the description which follows and, in part, will be obvious from the description, or may be learned by practice of the disclosure.

In accordance with one aspect of the present disclosure, an actuator includes a motor configured to generate torque, a gear device configured to amplify the torque, a belt driving device configured to transfer the torque to the gear device, and a bracket unit configured to fix a distance between a rotation shaft of the motor and a gear shaft of the gear device, wherein the bracket unit includes a pair of support members configured to support a portion of an outer peripheral surface of a belt gear in the bracket driving device and prevent tooth disengagement of the belt gear.

The pair of support members may be spaced apart from each other by a certain distance and may be disposed in a slack side span and a tight side span, which are formed when the belt gear rotates.

Each of the pair of support members may have a cylindrical shape, and one support member of the pair of support members may have a diameter larger than a diameter of the other support member.

The support member having the larger diameter may be disposed in the slack side span, in a configuration in which a large load is generated when the motor generates the torque.

An idler may be installed on each of the pair of support members.

The bracket unit may include a first bracket installed at an upper end of the motor such that the rotation shaft penetrates the first bracket, and a second bracket having one end installed at an upper end of the first bracket and the other end installed at the gear shaft, wherein the pair of support members are provided between an upper surface of the first bracket and a lower surface of the second bracket.

In accordance with another aspect of the present disclosure, an actuator includes a motor configured to generate torque, a gear device configured to amplify the torque, a belt driving device configured to transfer the torque to the gear device, a bracket unit configured to fix a distance between a rotation shaft of the motor and a gear shaft of the gear device, and a tensioner installed in the bracket unit to support a portion of an outer peripheral surface of a belt gear in the belt driving device and prevent tooth disengagement of the belt gear.

The tensioner may have an elastic member which is installed in the bracket unit adjacent to the rotation shaft and has a curved body portion with an arc shape, wherein both ends of the curved body portion are spaced apart from each other by a certain distance and are bent toward an outer surface of the belt gear, and roll members installed at both ends of the elastic member, wherein the both ends of the elastic member are disposed in a slack side span and a tight side span, which are formed when the belt gear rotates.

The tensioner may be installed to rotate on the rotation shaft when the motor generates the torque.

The tensioner may rotate in the same direction as a rotation direction of the rotation shaft to press the belt gear in the slack side span.

The bracket unit may include a first bracket installed at an upper end of the motor such that the rotation shaft penetrates the first bracket, and a second bracket having one end installed at an upper end of the first bracket and the other end installed at the gear shaft, wherein the first bracket has a curved installation portion having a curved surface which corresponds to the curved body portion such that the elastic member is installed thereat.

The first bracket may have a deviation prevention protrusion spaced apart from the curved installation portion by a certain distance to prevent a deviation of the elastic member installed at the curved installation portion.

The curved body portion may be installed in an elastically deformed state such that an external diameter thereof is reduced by an extent by which the curved body portion overlaps the curved installation portion.

In a state in which the tensioner is installed in the first bracket, the roll members installed at the both ends of the elastic member may be provided in a state of being pressed in a direction in which the roll members and an outer peripheral surface of the belt gear face each other.

The first bracket may have a first coupling portion protruding toward the second bracket and having a coupling groove formed therein in a lengthwise direction thereof, and the second bracket may have a second coupling portion provided at a position corresponding to the coupling groove so as to be inserted into the coupling groove.

The belt driving device may include a driving gear coupled to the rotation shaft of the motor, a driven gear coaxially coupled to the gear shaft of the gear device, and the belt gear configured to transfer the torque from the driving gear to the driven gear.

The driven gear may include a sun gear coaxially which is coupled to the gear shaft and rotates together with the driven gear to transfer the torque to the gear device.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
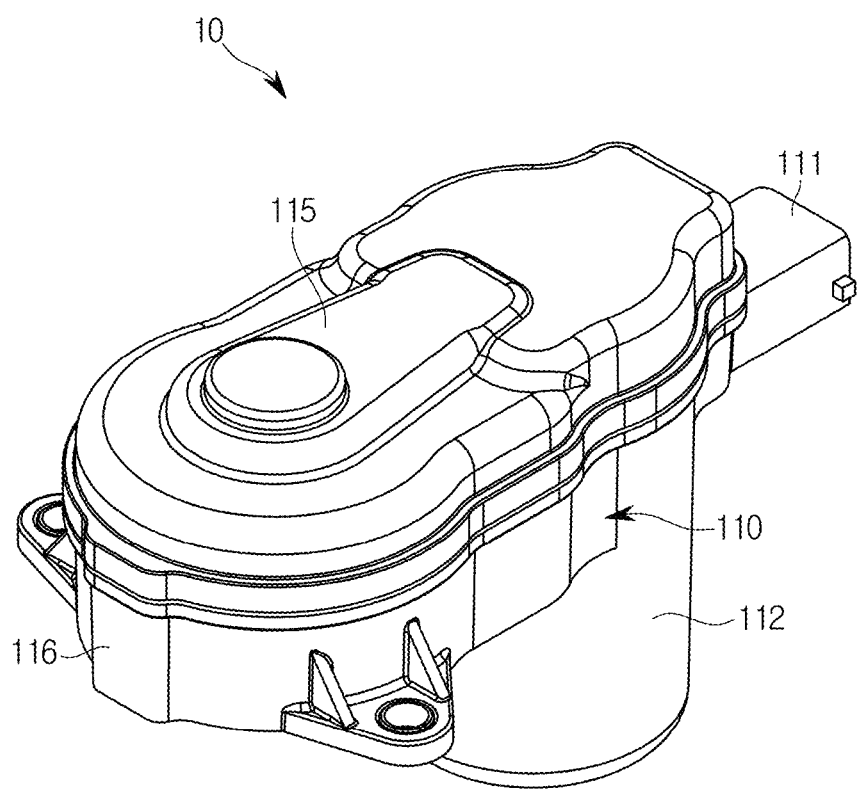
FIG. 1 is a perspective view illustrating an actuator in accordance with one embodiment of the present disclosure.

Reference will now be made in detail to the embodiments of the present disclosure, examples of which are illustrated in the accompanying drawings, wherein like reference numerals refer to like elements throughout.

Hereinafter, embodiments of the present disclosure will be described in detail with reference to the accompanying drawings. The following embodiments are provided to fully convey the scope of the disclosure to those skilled in the art. The present disclosure may, however, be embodied in many different forms and should not be construed as limited to the embodiments set forth herein. In order to make the present disclosure clear, portions irrelevant to the description will not be shown in the drawings, and the sizes of the components may be somewhat exaggerated in order to facilitate understanding of the present disclosure.

Figure 2:
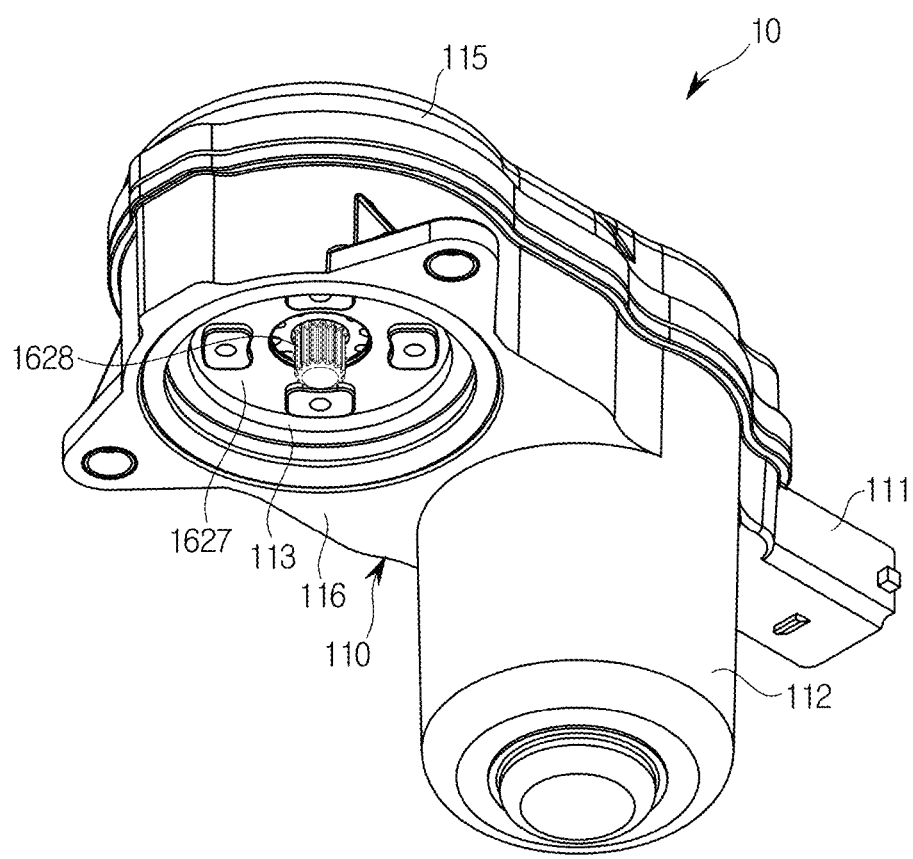
FIG. 2 is a bottom perspective view illustrating the actuator in accordance with one embodiment of the present disclosure.

FIG. 1 is a perspective view illustrating an actuator 10 in accordance with one embodiment of the present disclosure, and FIG. 2 is a bottom perspective view illustrating the actuator 10 in accordance with one embodiment of the present disclosure.

Referring to FIGS. 1 and 2, the actuator 10 in accordance with one embodiment of the present disclosure is realized as a single assembly. The actuator 10 is configured as a single assembly in which a driving module is assembled in an actuator housing 110. Here, the driving module may be configured as an independent assembly including a motor 120, a gear device 160, a belt driving device 130, and the like. An overall contour of the actuator 10 forms a shape which is surrounded by the actuator housing 110 and a cover 115. Thus, elements accommodated in the actuator housing 110 are protected by the actuator housing 110 and the cover 115 which is coupled with the actuator housing 110. The actuator 10 may be a device configured to transfer power by amplifying torque generated by the motor 120 and may be connected, for example, to an electronic parking brake to be used as a power source for a braking operation.

A connection sleeve 111 configured to connect an external power connector is provided on one side of the actuator housing 110. A terminal configured to apply a current to the motor 120 accommodated in the actuator housing 110 is installed in the connection sleeve 111. In addition, the actuator housing 110 may be provided such that an upper portion thereof is open. The actuator housing 110 may be divided into a motor accommodation portion 112 configured to accommodate the motor 120 and a gear accommodation portion 116 configured to accommodate the gear device 160. Here, since a portion of the actuator housing 110 configured to accommodate the gear device 160 is open, a final output gear 162S of the gear device 160 is externally exposed to facilitate coupling for power transfer.

Hereinafter, a detailed configuration of the actuator 10 in accordance with one embodiment of the present disclosure will be described.

Figure 3:
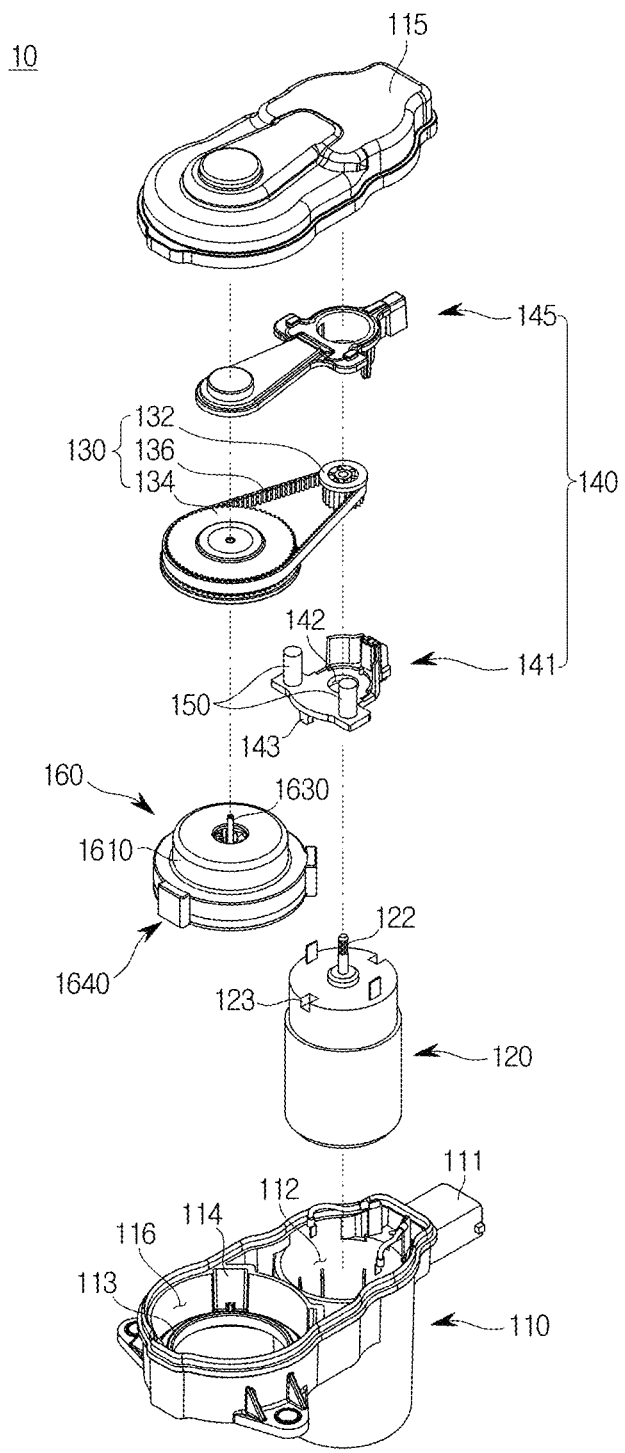
FIG. 3 is an exploded perspective view illustrating the actuator in accordance with one embodiment of the present disclosure.
Figure 4:
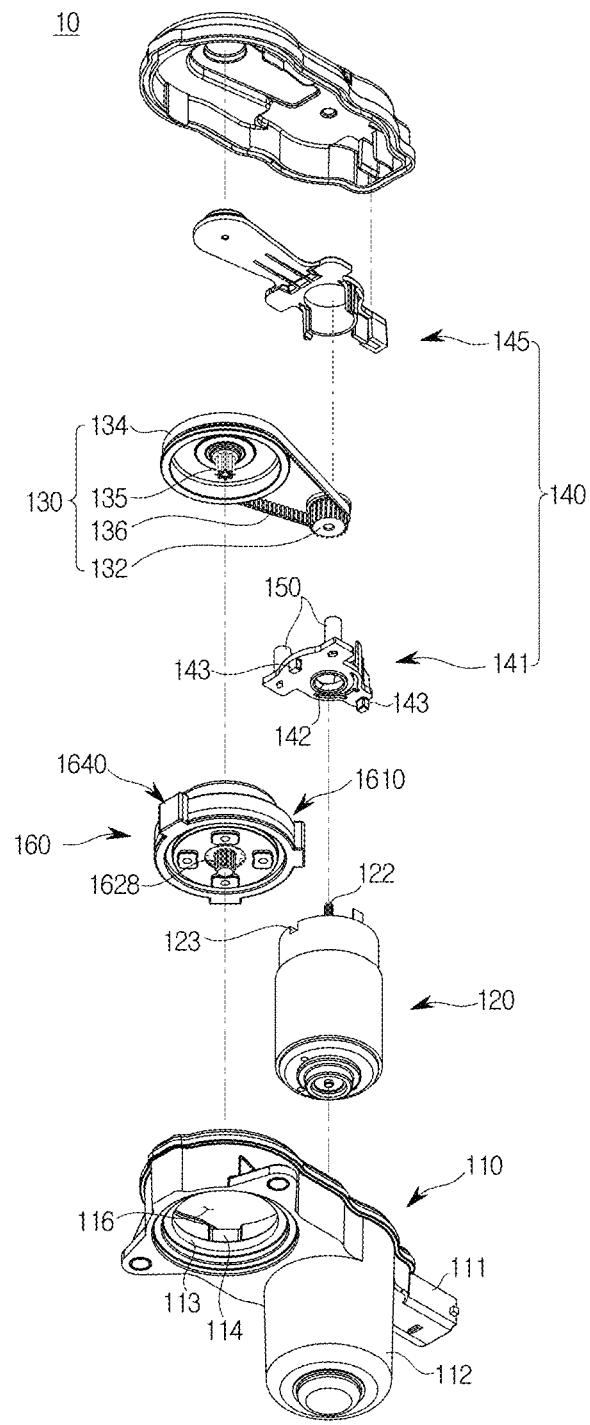
FIG. 4 is an exploded bottom perspective view illustrating the actuator in accordance with one embodiment of the present disclosure.
Figure 5:
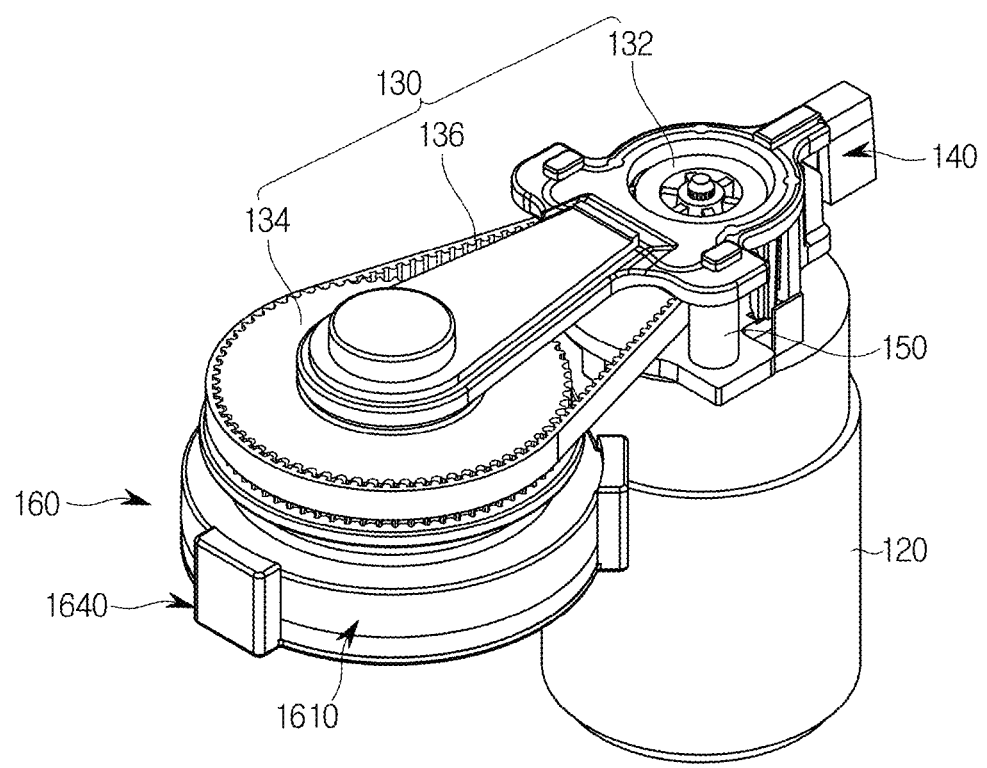
FIG. 5 is an assembled perspective view illustrating a driving module of the actuator in accordance with one embodiment of the present disclosure.
Figure 6:
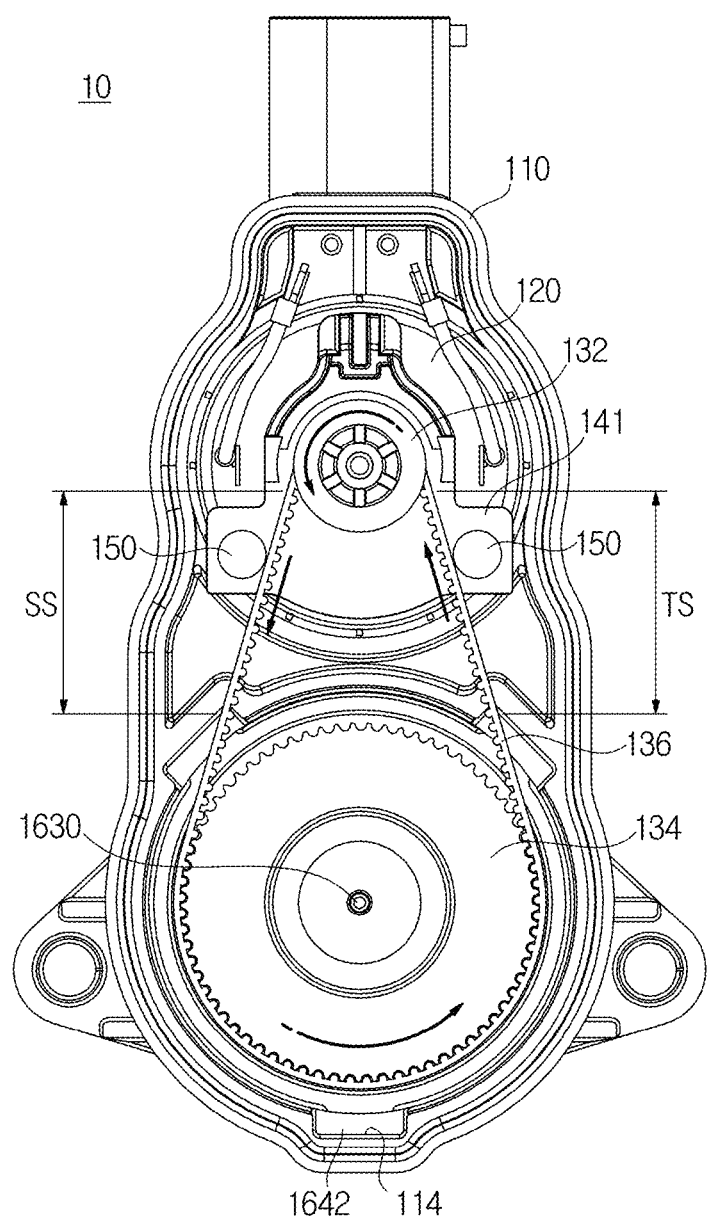
FIG. 6 is a top plan view illustrating the actuator in accordance with one embodiment of the present disclosure.

FIG. 3 is an exploded perspective view illustrating the actuator 10 in accordance with one embodiment of the present disclosure. FIG. 4 is an exploded bottom perspective view illustrating the actuator 10 in accordance with one embodiment of the present disclosure. FIG. 5 is an assembled perspective view illustrating the driving module of the actuator 10 in accordance with one embodiment of the present disclosure. FIG. 6 is a top plan view illustrating the actuator 10 in accordance with one embodiment of the present disclosure.

Referring to FIGS. 3 to 6, the actuator 10 includes the actuator housing 110, the cover 115, the motor 120, the belt driving device 130, the gear device 160, and a bracket unit 140.

The motor 120 is realized as an electric motor 120 generating torque. The motor 120 includes a rotation shaft 122 which receives power to rotate forward and in reverse. A driving gear 132 of the belt driving device 130 to be described later is coupled to the rotation shaft 122. In addition, coupling grooves 123 for coupling with the bracket unit 140 to be described later are formed on an upper surface of the motor 120. The motor 120 is accommodated in the motor accommodation portion 112 of the actuator housing 110.

The belt driving device 130 includes the driving gear 132, a driven gear 134, and a belt gear 136 configured to transfer torque from the driving gear 132 to the driven gear 134.

The driving gear 132 is installed on the rotation shaft 122 of the motor 120. The driving gear 132 rotates together with the rotation shaft 122 and functions to supply torque. In addition, gear teeth are formed on an outer peripheral surface of the driving gear 132 and are engaged with gear teeth of the belt gear 136.

The driven gear 134 is spaced apart from the driving gear 132 by a certain distance and is coupled to the gear device 160. The driven gear 134 is coaxially coupled to a gear shaft 1630 of the gear device 160. In addition, the driven gear 134 includes a sun gear 135 coaxially coupled to the gear shaft 1630 to rotate together with the driven gear 134. Here, the sun gear 135 is engaged with a planetary gear unit 1620 of the gear device 160, which will be described later, to transfer torque to the gear device 160. Gear teeth are formed on an outer peripheral surface of the driven gear 134 and are engaged with the gear teeth of the belt gear 136.

The belt gear 136 has a closed loop configuration in which gear teeth are provided on an inner peripheral surface thereof, and is engaged to surround the driving gear 132 and the driven gear 134 together. Therefore, the belt gear 136 is pulled according to rotation of the driving gear 132 to transfer torque to the driven gear 134.

When power is transferred through the belt gear 136, it is important to maintain tension of the belt gear 136 such that the belt gear 136 does not lose a power transfer function due to a slip, tooth disengagement, or the like of the belt gear 136. The tension of the belt gear 136 is changed due to environmental factors such as temperature as well as torque being applied through the driving gear 132. For example, the belt gear 136 is divided into a slack side span SS and a tight side span TS according to a change in the tension of the belt gear 136. The slack side span SS and the tight side span TS are spans in which the belt gear 136 is placed immediately after torque is supplied to the driving gear 132. Specifically, the slack side span SS is a span in which the belt gear 136 has just passed through the driving gear 132, and the tight side span TS is a span in which the belt gear 136 approaches the driving gear 132. Therefore, the slack side span SS and the tight side span TS may be mutually changed according to a rotation direction of the rotation shaft 122. Gear engagement between the belt gear 136 and the driven gear 134 is loosened in the slack side span SS according to the above-described change in the tension of the belt gear 136, resulting in a tooth disengagement phenomenon.

In accordance with one aspect of the present disclosure, the bracket unit 140 is provided to prevent the above-described tooth disengagement phenomenon of the belt gear 136.

The bracket unit 140 functions to fix a distance between the rotation shaft 122 of the motor 120 and the gear shaft 1630 of the gear device 160 and prevent tooth disengagement of the belt gear 136. Furthermore, when the distance between the rotation shaft 122 and the gear shaft 1630 is fixed by the bracket unit 140, tension may be applied to the belt gear 136. For example, when the belt gear 136 is assembled to surround the driving gear 132 and the driven gear 134, the belt gear 136 is loosely assembled to secure ease of assembly. This is because the motor 120 is accommodated in the actuator housing 110 so as to be moved within a certain range. As a result, when the bracket unit 140 is installed, the distance between the rotation shaft 122 and the gear shaft 1630 is fixed, and thus, tension is supplied to the belt gear 136.

More specifically, the bracket unit 140 includes a first bracket 141 installed at an upper end of the motor 120 and a second bracket 145 installed at an upper end of the first bracket 141.

The first bracket 141 has a through-hole 142 formed therein such that the rotation shaft 122 penetrates the through-hole 142 to be coupled to the driving gear 132. Coupling protrusions 143 are formed on a lower surface of the first bracket 141 and are inserted into and coupled to the coupling grooves 123 formed at the upper end of the motor 120. In addition, a pair of support members 150 are provided on an upper surface of the first bracket 141 to support a portion of an outer peripheral surface of the belt gear 136. The pair of support members 150 are shown and described as being installed on the first bracket 141, but the present disclosure is not limited thereto. The pair of support members 150 may be installed on a lower surface of the second bracket 145.

The pair of support members 150 are spaced apart from each other by a certain distance. As described above, the pair of support members 150 may be respectively disposed in the slack side span SS and the tight side span TS, which are formed when the belt gear 136 rotates. Since the pair of support members 150 are provided to support the outer peripheral surface of the belt gear 136, the pair of support members 150 may be formed to have a cylindrical surface so as to minimize friction with the belt gear 136. In addition, the pair of support members 150 may be coated with Teflon to reduce a frictional force with the belt gear 136.

Even when the slack side span SS of the belt gear 136 is changed by the rotation direction of the rotation shaft 122, the above-described pair of support members 150 can prevent tooth disengagement of the belt gear 136 by supporting the outer peripheral surface of the belt gear 136.

The second bracket 145 has one end installed at the upper end of the first bracket 141 and the other end installed at the gear shaft 1630. The second bracket 145 is coupled to the first bracket 141 to support the pair of support members 150 from an upper portion of the pair of support members 150. In addition, the second bracket 145 is coupled to the gear shaft 1630 to fix the distance between the rotation shaft 122 and the gear shaft 1630. Furthermore, the other end of the second bracket 145 rotatably supports the gear shaft 1630 and has a shape closely contact with and coupled to the cover 115 to stably maintain a coupled state.

On the other hand, various embodiments may be provided and applied to more effectively support the belt gear 136 and prevent tooth disengagement of the belt gear 136 through the pair of support members 150. For example, FIGS. 7 to 9 respectively illustrate embodiments of support members configured to maintain the tension of the belt gear 136 provided in the actuator 10 in accordance with one embodiment of the present disclosure.

Figure 7:
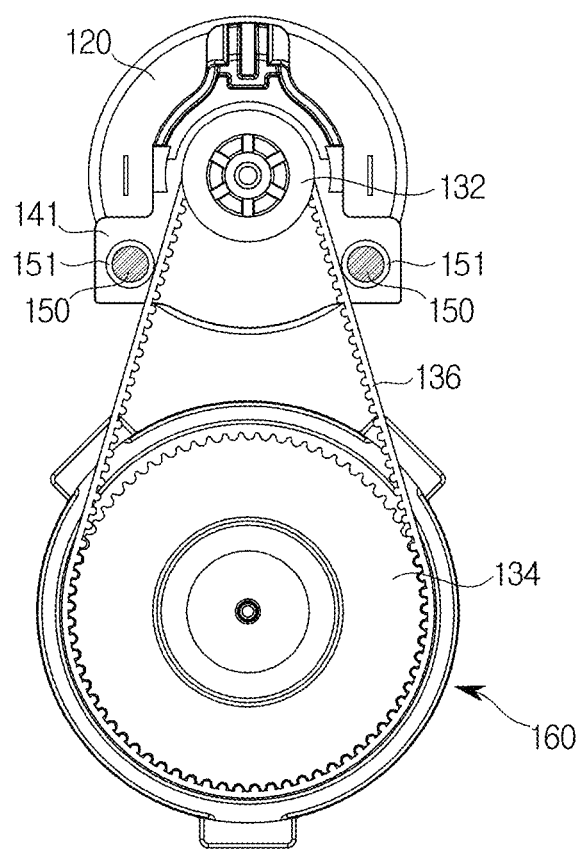
FIGS. 7 to 9 are views respectively illustrating embodiments of support members configured to maintain tension of a belt gear provided in the actuator in accordance with one embodiment of the present disclosure.

Referring to FIG. 7, an idler 151 is installed on each of a pair of support members 150. The idler 151 is rotatably installed on each of the pair of support members 150. In addition, the idler 151 is installed to contact the outer peripheral surface of the belt gear 136.

Figure 8:
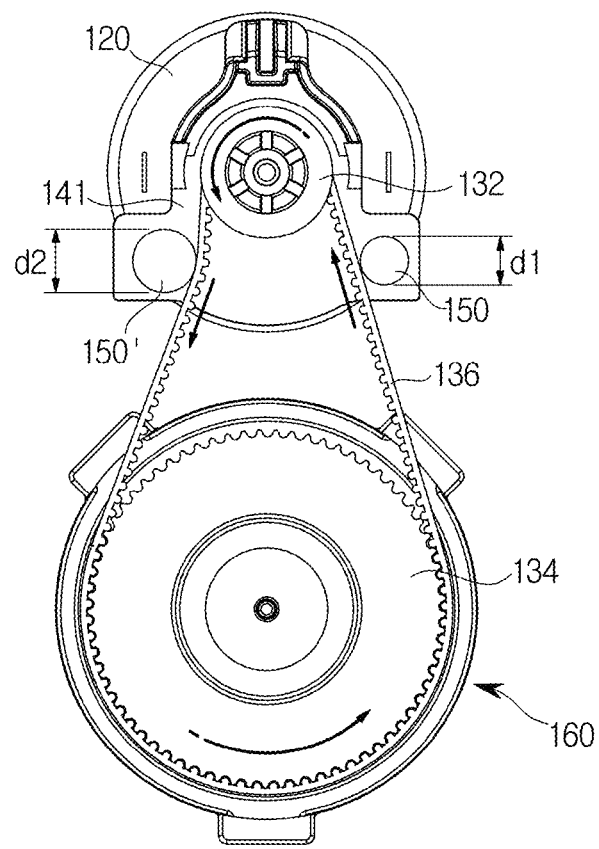

As shown in FIG. 8, a pair of support members 150 and 150' are formed to have different diameters. That is, one support member 150' of the pair of support members 150 and 150' is formed to have a diameter d2 larger than a diameter d1 of the other support member 150. The support member 150' having the larger diameter d2 may be disposed in the slack side span SS. Here, the slack side span SS may be designated when the rotation shaft 122 rotates in a direction in which a large load is applied to the motor 120 generating torque. For example, as described above, in a case in which the actuator 10 is coupled to an electronic parking brake (not shown) to transfer power, a large load is generated when power is transferred to generate a parking force. That is, when power is transferred in a direction in which a parking force is generated, a load of the motor 120 is increased in comparison to when power is transferred in a direction in which a parking force is released. For this reason, when a large load is generated in a case in which the rotation shaft 122 rotates in a counterclockwise direction during driving of the motor 120, as shown in FIG. 8, a left side of the belt gear 136 becomes the slack side span SS, and a right side thereof becomes the tight side span TS. Accordingly, among the pair of support members 150 and 150', the support member 150' having the larger diameter d2 is provided to support the belt gear 136 in the left slack side span SS.

Figure 9:
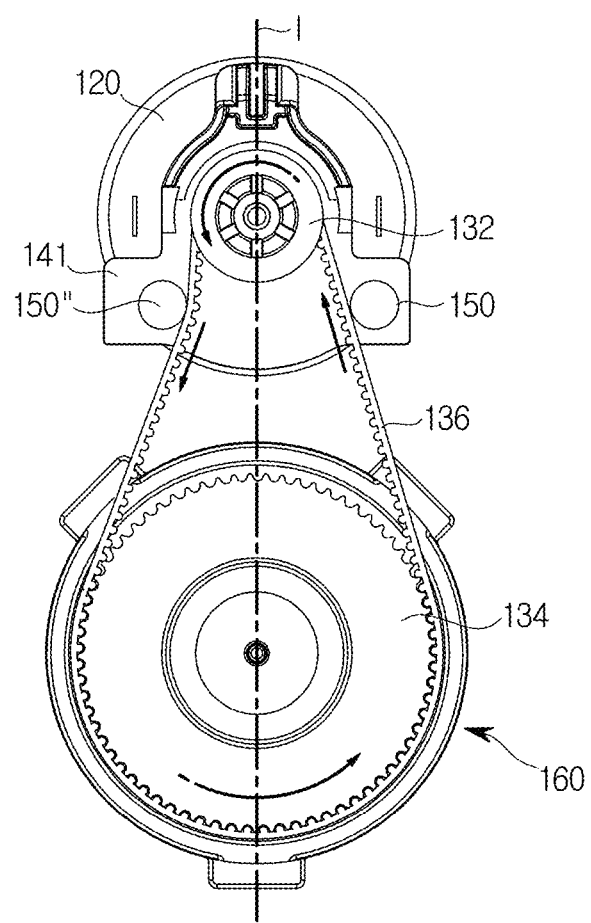

Referring to FIG. 9, one support member 150" of the pair of support members 150 and 150" is installed so as to be biased toward one direction. That is, to support the outer peripheral surface of the belt gear 136, the pair of support members 150 and 150" are provided on both sides of a virtual line I connecting the rotation shaft 122 and the gear shaft 1630. In this case, the one support member 150" is installed so as to be biased toward the support member 150 opposite thereto. That is, among the pair of support members 150 and 150", the support member 150" disposed in the slack side span SS is installed to be biased. As described in the previous embodiment, such a configuration is provided to more effectively support the slack side span SS placed in a direction in which a large load is generated in the motor 120.

As described above, tension is supplied to the belt gear 136 and tooth disengagement of the belt gear 136 is prevented by the bracket unit 140, thereby stably transferring torque generated from the motor 120 to the gear device 160. The gear device 160 receiving the torque may be provided as a deceleration device which has a planetary gear assembly configuration so as to amplify and output torque. A detailed configuration of the gear device 160 is shown in FIGS. 10 to 12.

Figure 10:
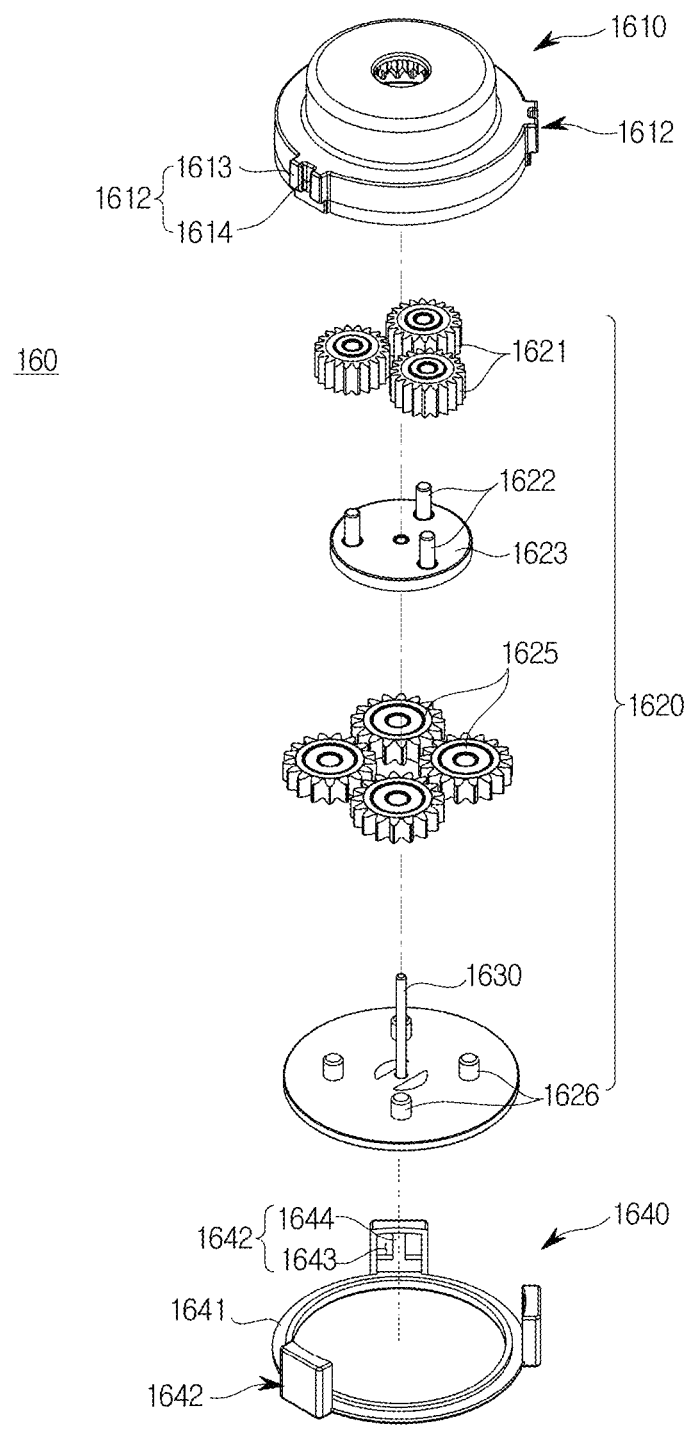
FIG. 10 is an exploded perspective view illustrating a gear device provided in the actuator in accordance with one embodiment of the present disclosure.

FIG. 10 is an exploded perspective view illustrating the gear device 160 provided in the actuator 10 in accordance with one embodiment of the present disclosure. FIG. 11 is an exploded bottom perspective view illustrating the gear device 160 provided in the actuator 10 in accordance with one embodiment of the present disclosure. FIG. 12 is a cross-sectional view illustrating the gear device 160 provided in the actuator 10 in accordance with one embodiment of the present disclosure.

Figure 11:
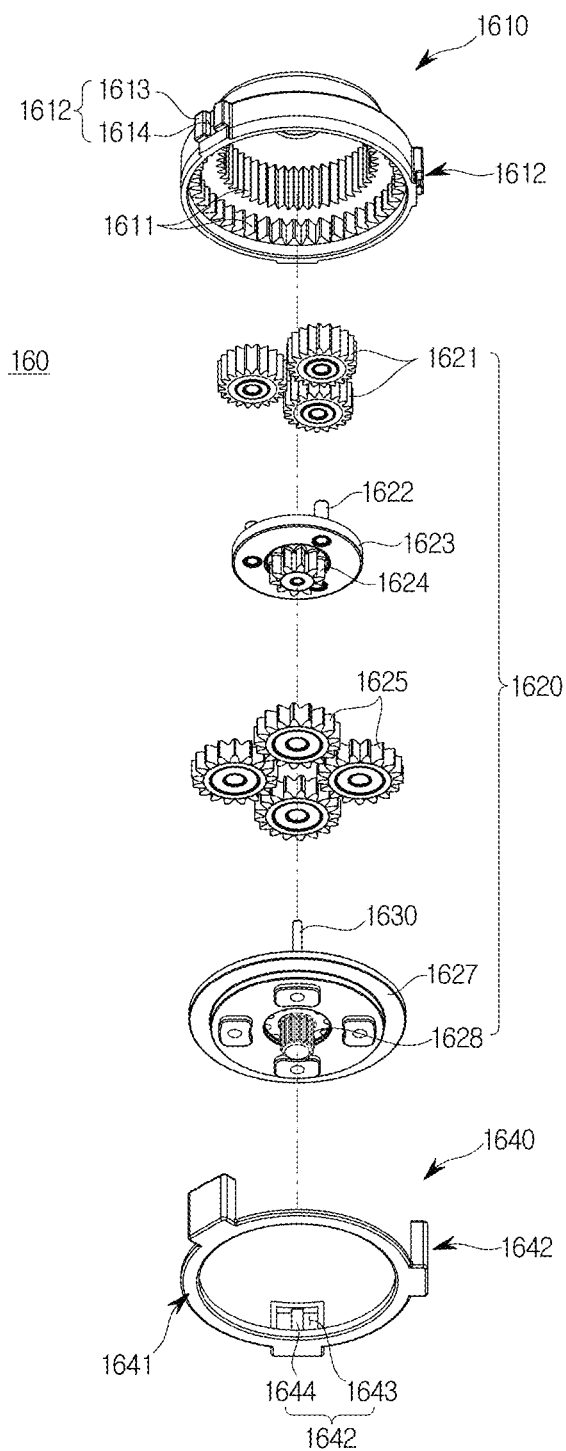
FIG. 11 is an exploded bottom perspective view illustrating the gear device provided in the actuator in accordance with one embodiment of the present disclosure.
Figure 12:
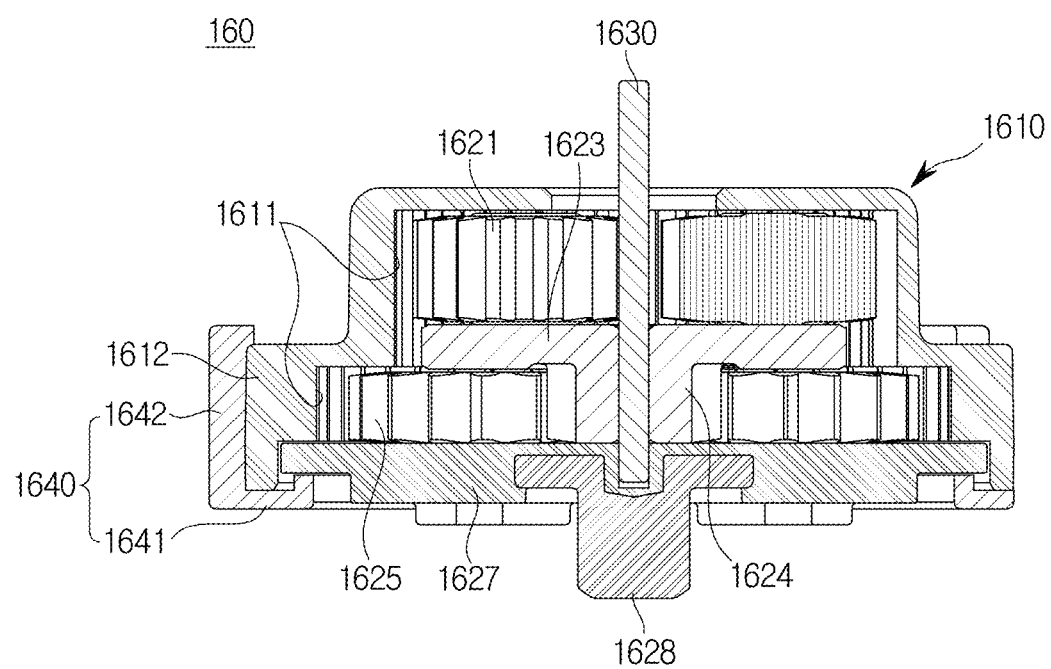
FIG. 12 is a cross-sectional view illustrating the gear device provided in the actuator in accordance with one embodiment of the present disclosure.

Referring to FIGS. 10 to 12, the gear device 160 includes a ring gear unit 1610, a planetary gear unit 1620 installed inside the ring gear unit 1610, and a holder 1640 configured to prevent the planetary gear unit 1620 from detaching from the ring gear unit 1610. The gear device 160 may be coaxially connected through the single gear shaft 1630 and may be provided as a single assembly.

More specifically, the ring gear unit 1610 has internal gears 1611 formed on an inner peripheral surface thereof. The internal gears 1611 are provided in two gear stages. That is, the ring gear unit 1610 has a stepped shape such that the two gear stages have different diameters. Here, the ring gear unit 1610 is formed such that a diameter of a lower side thereof is larger than a diameter of an upper side thereof.

The internal gears 1611 are respectively provided in the two gear stages, and the planetary gear unit 1620 may be installed in the two gear stages. Here, the two gear stages are distinguished into a first gear stage located at an upper side and a second stage located at a lower side of the ring gear unit 1610. The lower side of ring gear unit 1610 is open such that the planetary gear unit 1620 is installed inside the ring gear unit 1610. The ring gear unit 1610 has a hole formed in the upper side thereof, through which the sun gear 135 of the driven gear 134 is inserted. In addition, mounting portions 1612 each having a mounting protrusion 1613 and a mounting groove 1614 are formed at regular intervals on an outer peripheral surface of the ring gear unit 1610. The mounting portions 1612 protrude radially from the outer peripheral surface of the ring gear unit 1610 and have an uneven shape. The mounting portions 1612 are coupled to the holder 1640, which will be described later, and are supported by the actuator housing 110. Configurations in which the mounting portions 1612 are coupled to the holder 1640 and are assembled to the actuator housing 110 will be described below again.

The planetary gear unit 1620 is installed inside the ring gear unit 1610. In this case, since the ring gear unit 1610 has the first and second gear stages, the planetary gear unit 1620 has a two-stage planetary gear assembly configuration. Thus, the planetary gear unit 1620 includes a first gear unit installed in the first gear stage and a second gear unit installed in the second gear stage.

The first gear unit includes three first planetary gears 1621 engaged between the sun gear 135 formed in the driven gear 134 and the internal gear 1611 of the first gear stage, and a first carrier 1623 rotatably supporting the first planetary gears 1621 and coaxially rotating with the sun gear 135. A plurality of first pin shafts 1622, respectively coupled to a plurality of first planetary gears 1621, are installed on an upper surface of the first carrier 1623. In addition, a second sun gear 1624 is installed on a lower surface of the first carrier 1623 so as to be coaxial with the sun gear 135, and rotates together with the first carrier 1623.

The second gear unit includes four second planetary gears 1625 engaged between the second sun gear 1624 and the internal gear 1611 of the second gear stage, and a second carrier 1627 rotatably supporting the second planetary gears 1625 and coaxially rotating with the second sun gear 1624. A plurality of second pin shafts 1626, respectively coupled to a plurality of second planetary gears 1625, are installed on an upper surface of the second carrier 1627. In addition, a final output gear 1628 is installed on a lower surface of the second carrier 1627 so as to be coaxial with the second sun gear 1624. This final output gear 1628 rotates together with the second carrier 1627 to output amplified torque.

The gear shaft 1630 is coupled to the upper surface of the second carrier 1627. The gear shaft 1630 is coaxial with the final output gear 1628, the second sun gear 1624, the sun gear 135, and the driven gear 134 and is rotatably supported by the bracket unit 140.

The holder 1640 functions to prevent the planetary gear unit 1620 installed inside the ring gear unit 1610 from being detached from the ring gear unit 1610. In addition, the holder 1640 receives torque through the belt driving device 130 and functions to absorb vibration generated during driving. The holder 1640 is made of an elastic material. For example, the holder 1640 may be made of an ethylene-propylene-diene monomer (EPDM) rubber material. The holder 1640 is installed in the ring gear unit 1610 to support one end of the ring gear unit 1610, i.e., a lower end of the second carrier 1627.

More specifically, the holder 1640 has a first fixing portion 1641 coupled to an one open end of the ring gear unit 1610, and second fixing portions 1642 extending from the first fixing portion 1641 and coupled to an outer surface of the ring gear unit 1610.

The first fixing portion 1641 is formed to have a ring shape. Thus, the first fixing portion 1641 is coupled to close a certain section of the one open end of the ring gear unit 1610. In addition, the first fixing portion 1641 is bent toward the second carrier 1627 inside the ring gear unit 1610. Therefore, the first fixing portion 1641 supports the lower end of the second carrier 1627 to prevent the planetary gear unit 1620 from detaching from the ring gear unit 1610.

The second fixing portions 1642 are spaced apart from one another by a certain distance along an edge of the first fixing portion 1641. The second fixing portions 1642 are coupled to the mounting portions 1612 formed on the outer peripheral surface of the ring gear unit 1610. Thus, the second fixing portions 1642 are formed at positions corresponding to the mounting portions 1612. In addition, the second fixing portions 1642 are coupled to surround the mounting portions 1612. Each of the second fixing portions 1642 has a fixing groove 1643 and a fixing protrusion 1644 corresponding to the mounting protrusion 1613 and the mounting groove 1614 of each of the mounting portions 1612. That is, the mounting protrusion 1613 is inserted into the fixing groove 1643, and the fixing protrusion 1644 is inserted into and coupled to the mounting groove 1614.

As the holder 1640 is assembled to the ring gear unit 1610, the gear device 160 is provided as a single assembly and is assembled to the actuator housing 110. As shown in FIGS. 3, 4, and 6, support grooves 114 corresponding to the second fixing portions 1642 are formed in the actuator housing 110 such that the second fixing portions 1642 are inserted thereinto. Therefore, when the gear device 160 provided as a single assembly is assembled to the actuator housing 110, the second fixing portions 1642 are inserted into the support grooves 114, thereby attenuating vibration transferred to the actuator housing 110.

Figure 13:
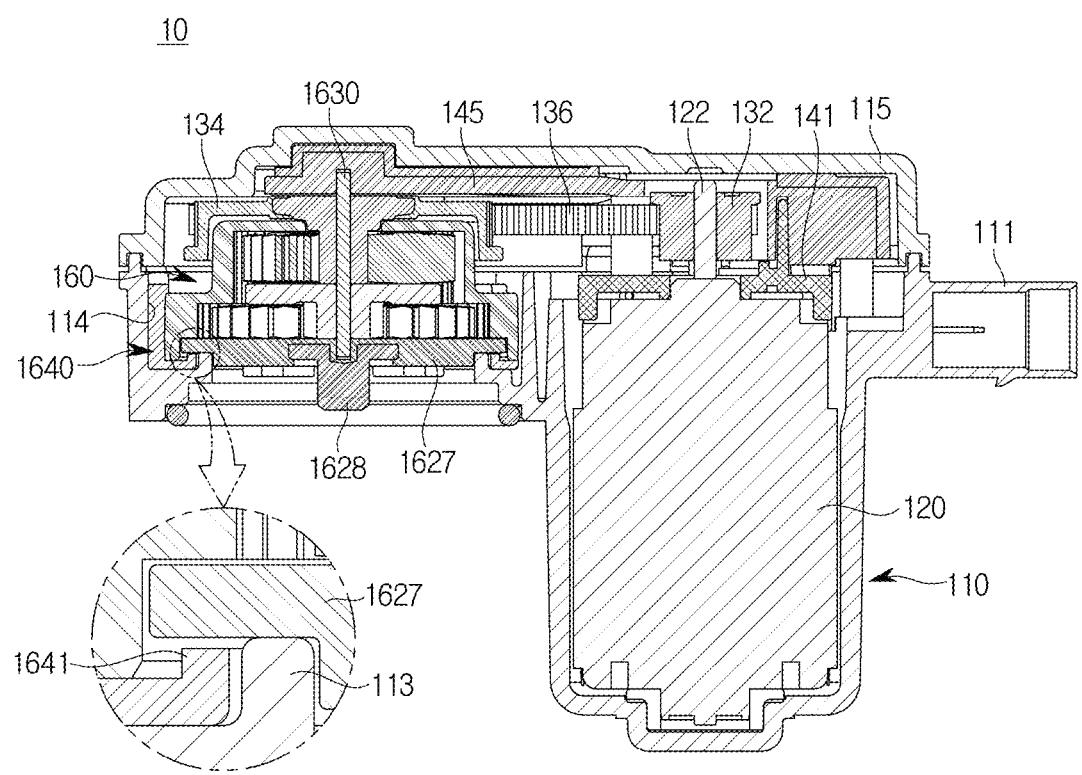
FIG. 13 is a cross-sectional view illustrating the actuator in accordance with one embodiment of the present disclosure.

A protruding support portion 113 is provided in the actuator housing 110 to support one end side of the planetary gear unit 1620 when the gear device 160 is assembled to the actuator housing 110. FIG. 13 is a cross-sectional view illustrating the actuator 10 in accordance with one embodiment of the present disclosure. Referring to FIG. 13, the lower end of the second carrier 1627 is supported by the protruding support portion 113 in a state in which the gear device 160 is assembled to the gear accommodation portion 116. That is, the protruding support portion 113 protrudes toward the planetary gear unit 1620 such that the first fixing portion 1641 and the second carrier 1627 are not in contact with each other. Therefore, the planetary gear unit 1620 is supported by the holder 1640 in a state in which the gear device 160 is not assembled to the actuator housing 110, and the planetary gear unit 1620 is supported by the protruding support portion 113 in a state in which the gear device 160 is assembled to the actuator housing 110. This is to minimize a frictional force generated between the holder 1640, which is made of a rubber material, and the rotating second carrier 1627.

Figure 14:
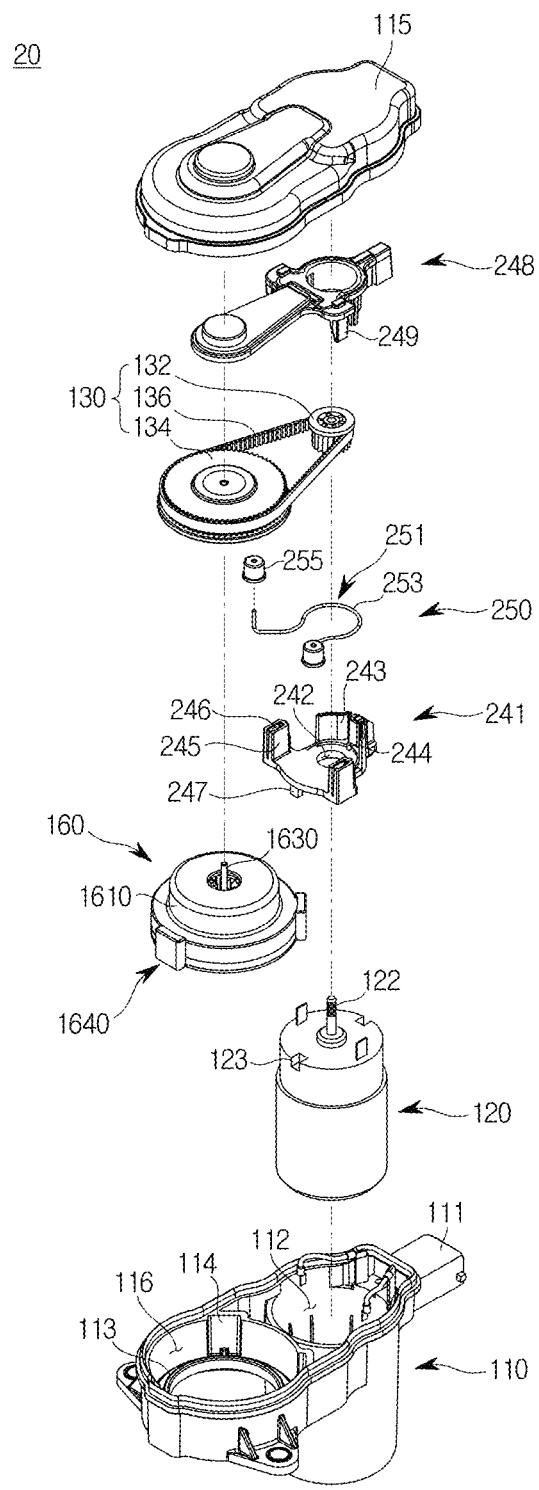
FIG. 14 is an exploded perspective view illustrating an actuator in accordance with another embodiment of the present disclosure.

Although the above-described actuator 10 has been shown and described as preventing tooth disengagement of the belt gear 136 by using the pairs of support members formed by 150, 150', and 150" provided on the bracket unit 140, a separate member capable of maintaining the tension of the belt gear 136 may also be provided to prevent the tooth disengagement of the belt gear 136. Such an embodiment is shown in FIG. 4. FIG. 14 is an exploded perspective view illustrating an actuator 20 in accordance with another embodiment of the present disclosure. Here, like reference numerals designate like components with like functions in the former drawings.

Referring to FIG. 14, the actuator 20 in accordance with the present embodiment includes an actuator housing 110, a cover 115, a motor 120, a belt driving device 130, a gear device 160, a bracket unit 240, and a tensioner 250. Here, configurations of the motor 120, the belt driving device 130, and the gear device 160 installed in the actuator housing 110 are the same as those of the previous embodiment, and a detailed description thereof will be omitted.

The bracket unit 240 functions to fix a distance between a rotation shaft 122 of the motor 120 and a gear shaft 1630 of the gear device 160 and apply tension to a belt gear 136. The bracket unit 240 includes a first bracket 241 installed at an upper end of the motor 120 and a second bracket 248 installed at an upper end of the first bracket 241.

The first bracket 141 has a through-hole 242 formed therein such that the rotation shaft 122 penetrates the through-hole 242 so as to be coupled to a driving gear 132. Coupling protrusions 247 are formed on a lower surface of the first bracket 241 and are inserted into and coupled to coupling grooves 123 formed at an upper end of the motor 120. In addition, first coupling portions 245 for coupling with the second bracket 248 and a curved installation portion 243 for coupling with the tensioner 250, which will be described later, are formed on an upper surface of the first bracket 241. The first coupling portions 245 protrude upward, i.e., in an installation direction of the second bracket 248. Each of the first coupling portions 245 has a coupling groove 246 formed therein in a lengthwise direction thereof. Here, in order to avoid interference when the belt gear 136 is assembled and operated, the first coupling portions 245 are spaced apart from each other toward both sides of an outer peripheral surface of the belt gear 136. The curved installation portion 243 is formed on a rear side of the first bracket 241 so as to have an arc-shaped curved surface.

On the other hand, in order to support the tensioner 250 and prevent a deviation of the tensioner 250 installed at the curved installation portion 243, a deviation prevention protrusion 244 is formed in the first bracket 241 so as to protrude upward and be spaced apart from the curved installation portion 243 by a certain distance. A configuration in which the tensioner 250 is installed in the first bracket 241 will be described below again.

The second bracket 248 has one end installed at the upper end of the first bracket 241 and the other end installed at the gear shaft 1630. When the second bracket 248 is coupled to the first bracket 241, the second bracket 248 is coupled to the gear shaft 1630 to fix a distance between the rotation shaft 122 and the gear shaft 1630. In addition, second coupling portions 249, coupled to the first coupling portions 245, are formed at a lower end of one end side of the second bracket 248. The second coupling portions 249 are formed at positions corresponding to the first coupling portions 245. As shown, the second coupling portions 249 are inserted into and coupled to the coupling grooves 246 of the first coupling portions 245. The other end of the second bracket 248 rotatably supports the gear shaft 1630 and has a form in which it makes close contact with and is coupled to the cover 115 to allow a coupled state to be stably maintained.

Figure 15:
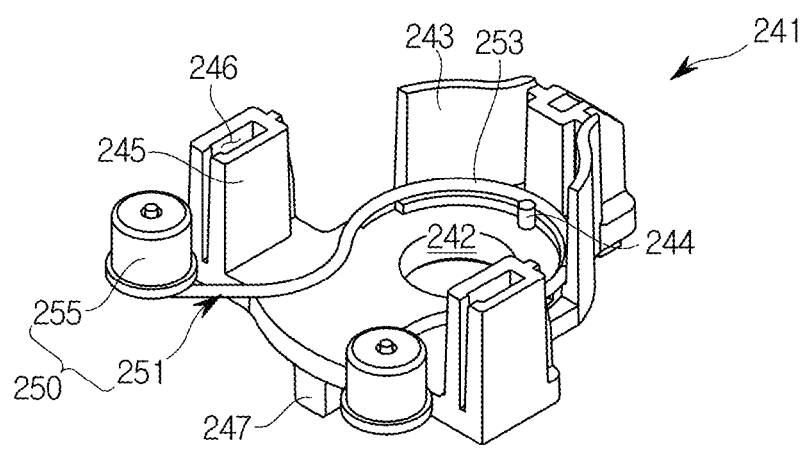
FIG. 15 is a perspective view illustrating a state in which a tensioner is installed in a bracket unit provided in the actuator in accordance with another embodiment of the present disclosure.
Figure 16:
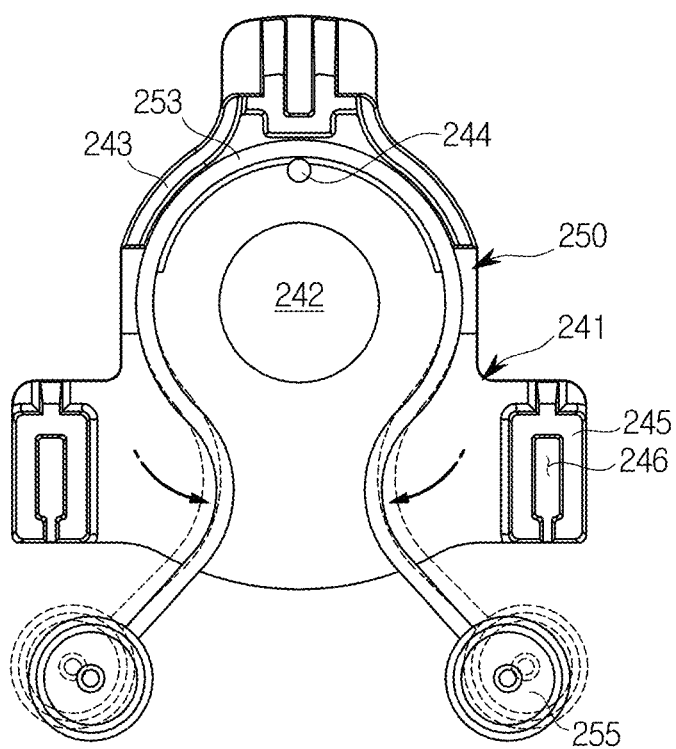
FIG. 16 is a view illustrating a state in which the tensioner provided in the actuator in accordance with another embodiment of the present disclosure is installed while being elastically deformed.
Figure 17:
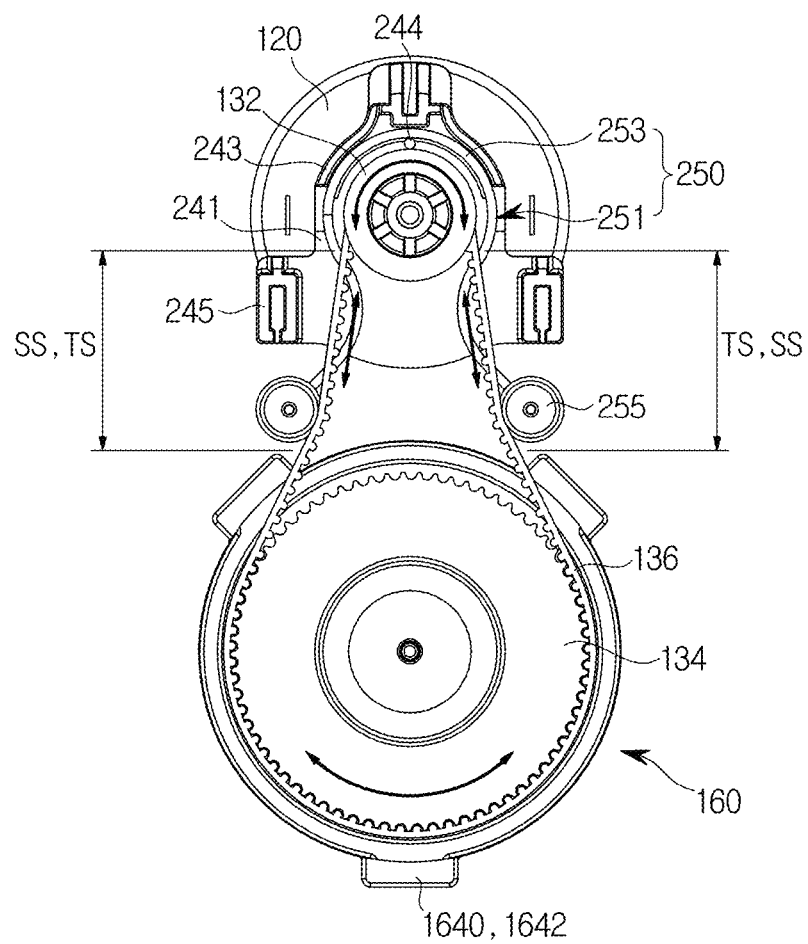
FIG. 17 is a top plan view illustrating the actuator in accordance with another embodiment of the present.

The tensioner 250 is installed in the bracket unit 240 and functions to support a portion of an outer peripheral surface of the belt gear 136 in the belt driving device 130 and prevent tooth disengagement of the belt gear 136. FIGS. 15 to 17 illustrate a state in which the tensioner 250 is installed in the bracket unit 240 and a state in which the tensioner 250 supports the belt gear 136. FIG. 15 is a perspective view illustrating a state in which the tensioner 250 is installed in the bracket unit 240 provided in the actuator 20 in accordance with another embodiment of the present disclosure. FIG. 16 is a view illustrating a state in which the tensioner 250 provided in the actuator 20 in accordance with another embodiment of the present disclosure is installed while being elastically deformed. FIG. 17 is a top plan view illustrating the actuator 20 in accordance with another embodiment of the present disclosure.

Referring to FIGS. 15 to 17, the tensioner 250 has an elastic member 251 installed in the bracket unit 240 and roll members 255 installed on the elastic member 251.

The elastic member 251 is installed in the first bracket 241 adjacent to the rotation shaft 122. The elastic member 251 has both ends spaced apart from each other by a certain distance, and a curved body portion 253 having an arc shape. In this case, both ends of the elastic member 251 are bent toward an outer surface of the belt gear 136 and are located adjacent to the outer surface of the belt gear 136. That is, both ends of the elastic member 251 may be disposed in a slack side span SS and a tight side span TS, which are formed when the belt gear 136 rotates. The elastic member 251 may be made of a wire spring having an elastic force. In addition, the curved body portion 253 is formed to have a curved surface corresponding to the curved installation portion 243.

The roll members 255 are installed at both ends of the elastic member 251, respectively. The roll members 255 may be rotatably installed at both ends of the elastic member 251. In addition, the roll members 255 are installed at both ends of the elastic member 251 to support the outer surface of the belt gear 136.

When the above-described tensioner 250 is installed in the first bracket 241, the curved body portion 253 of the elastic member 251 may be guided by the curved installation portion 243 and thus may be stably installed. In addition, since the tensioner 250 is supported by the deviation prevention protrusion 244 spaced apart from the curved installation portion 243 by a certain distance, a deviation of the tensioner 250 is prevented. That is, the curved body portion 253 is installed between the curved installation portion 243 and the deviation prevention protrusion 244. When the tensioner 250 is installed in the first bracket 241, both ends of the elastic member 251 are inserted and coupled while being pressed in a direction in which they face each other. After the coupling is completed, both ends of the elastic member 251 are returned to an original position by an elastic restoring force thereof. In this case, an outer surface of the curved body portion 253 overlaps an installation surface of the curved installation portion 243 by a certain extent. Accordingly, the curved body portion 253 is installed in an elastically deformed state such that an external diameter thereof is reduced by the certain extent by which the outer surface of the curved body portion 253 overlaps the curved installation portion 243. That is, in a state in which the tensioner 250 is installed in the first bracket 241, both ends of the elastic member 251 are maintained in a state in which they are elastically deformed in a direction in which they face each other. Therefore, the outer peripheral surface of the belt gear 136 is pressed inwardly by the roll member 255 of the tensioner 250. Thus, when the tensioner 250 is installed in the first bracket 241, a certain amount of tension is generated in the belt gear 136.

Figure 18:
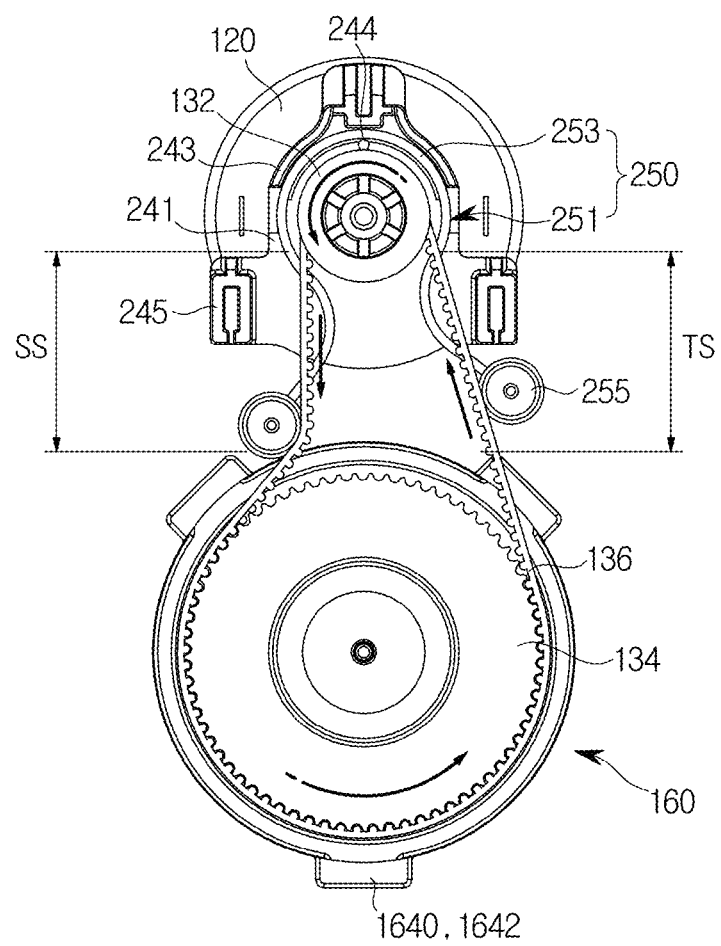
FIGS. 18 and 19 are views illustrating an operation state of the tensioner configured to maintain tension of a belt gear according to driving of the actuator in accordance with another embodiment of the present disclosure.
Figure 19:
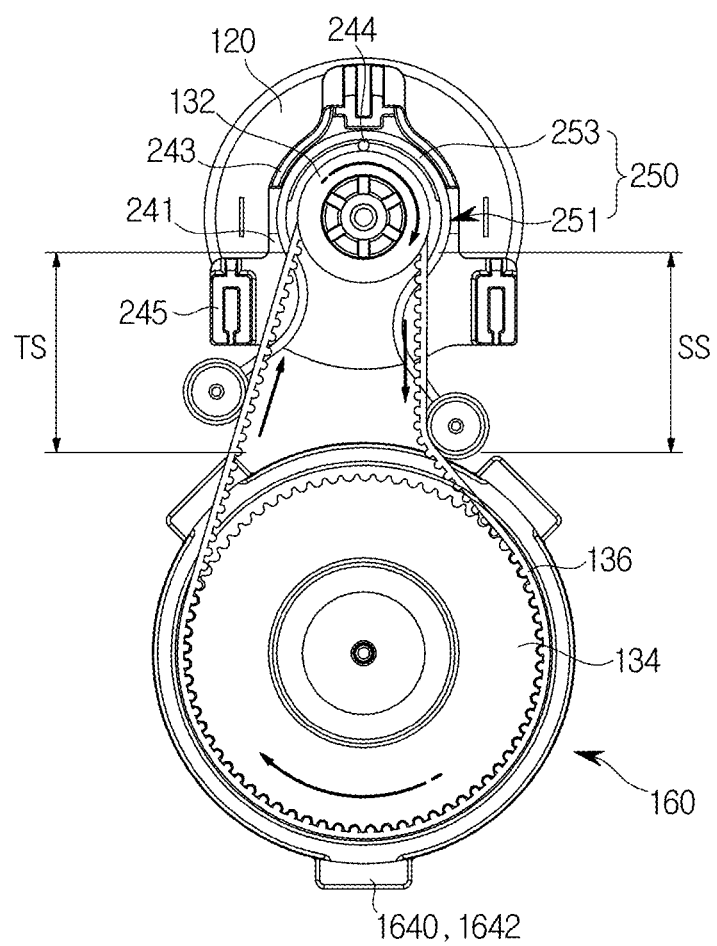

The tensioner 250 may be installed so as to rotate on the rotation shaft 122 by a certain angle when the motor 120 generates torque. That is, the tensioner 250 may rotate in the same direction as a rotation direction of the rotation shaft 122 to press the belt gear 136 in the slack side section SS. In this case, as described above, the belt gear 136 may be divided into the slack side span SS and the tight side span TS according to a change in tension thereof. That is, the slack side span SS is a span in which the belt gear 136 has just passed through the driving gear 132, and the tight side span TS is a span in which the belt gear 136 approaches the driving gear 132. Therefore, the slack side span SS and the tight side span TS are mutually changed according to the rotation direction of the rotation shaft 122. FIGS. 18 and 19 respectively illustrate operation states of the tensioner 250 configured to maintain the tension of the belt gear 136 according to driving of the actuator 20 in accordance with another embodiment of the present disclosure.

Referring to FIG. 18, when the motor 120 generates torque, in a case in which the rotation shaft 122 rotates in a counterclockwise direction, a left side of the belt gear 136 becomes the slack side span SS and a right side thereof becomes the tight side span TS. Thus, the tensioner 250 rotates in the same counterclockwise direction as the rotation shaft 122. This is because in a state in which the roll member 255 is provided to press the outer peripheral surface of the belt gear 136, the roll member 255 receives a certain amount of torque according to a change in tension of the tight side span TS of the belt gear 136 when torque is generated. That is, the tensioner 250 rotates in the counterclockwise direction such that the roll member 255 supporting the slack side span SS presses the belt gear 136. As a result, the belt gear 136 in the slack side span SS is pressed toward the driven gear 134, thereby preventing sagging of the belt gear 136 and effectively preventing tooth disengagement of the belt gear 136.

In addition, when the rotation shaft 122 rotates in a clockwise direction, as shown in FIG. 19, the right side of the belt gear 136 becomes the slack side span SS, and the left side thereof becomes the tight side span TS. Therefore, as described above, the tensioner 250 rotates in the same clockwise direction as the rotation shaft 122 and presses the belt gear 136 in the tight side span TS.

As described above, the tensioner 250 can support the outer peripheral surface of the belt gear 136 to generate a certain amount of tension. In addition, the tensioner 250 can press the belt gear 136 in the slack side span SS toward the driven gear 134 while rotating in a direction corresponding to the rotation direction of the rotation shaft 122 when torque is generated, thereby effectively preventing tooth disengagement of the belt gear 136.

When the actuator 20 including the tensioner 250 is operated, vibration can be attenuated by the second fixing portions 1642 of the holder 1640 provided in the gear device 160.

As is apparent from the above description, in an actuator in accordance with one embodiment of the present disclosure, an outer peripheral surface of a belt gear can be supported to prevent tooth disengagement caused by a change in tension of the belt gear when torque is generated, thereby stably transferring power. In particular, the belt gear in a slack side span can be supported when torque is generated, thereby effectively preventing tooth disengagement.

In addition, a planetary gear unit provided in a gear device can be prevented from being disengaged from a ring gear unit, and can perform a damping function to reduce vibration and noise without addition of a separate damping element.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An actuator comprising:
a motor configured to generate torque;
a gear device configured to amplify the torque;
a belt driving device configured to transfer the torque to the gear device; and
a bracket unit configured to fix a distance between a rotation shaft of the motor and a gear shaft of the gear device,
wherein the bracket unit includes:
a pair of support members configured to support a portion of an outer peripheral surface of a belt gear in the bracket driving device and prevent tooth disengagement of the belt gear; and
an elastic member installed in the bracket unit and having a curved body portion with an arc shape, and
wherein the bracket unit includes a first bracket installed at an upper end of the motor such that the rotation shaft of the motor penetrates the first bracket, and a second bracket having one end installed at an upper end of the first bracket and the other end installed at the gear shaft, and the first bracket has a curved installation portion having a curved surface which corresponds to the curved body portion such that the elastic member is installed at the curved installation portion.

2. The actuator of claim 1, wherein the pair of support members are spaced apart from each other by a certain distance and are disposed in a slack side span and a tight side span, which are formed when the belt gear rotates.

3. The actuator of claim 2, wherein each of the pair of support members has a cylindrical shape, and one support member of the pair of support members has a diameter larger than a diameter of the other support member.

4. The actuator of claim 3, wherein the support member having the larger diameter is disposed in the slack side span, in a configuration in which a large load is generated when the motor generates the torque.

5. The actuator of claim 1, wherein an idler is installed on each of the pair of support members.

6. The actuator of claim 1,
wherein the pair of support members are provided between an upper surface of the first bracket and a lower surface of the second bracket.

7. The actuator of claim 1, wherein:
the belt driving device includes a driving gear coupled to the rotation shaft of the motor;
a driven gear coaxially coupled to the gear shaft of the gear device; and
the belt gear configured to transfer the torque from the driving gear to the driven gear.

8. The actuator of claim 7, wherein the driven gear includes a sun gear which is coaxially coupled to the gear shaft and rotates together with the driven gear to transfer the torque to the gear device.

9. An actuator comprising:
a motor configured to generate torque;
a gear device configured to amplify the torque;
a belt driving device configured to transfer the torque to the gear device;
a bracket unit configured to fix a distance between a rotation shaft of the motor and a gear shaft of the gear device; and
a tensioner installed in the bracket unit to support a portion of an outer peripheral surface of a belt gear in the belt driving device and prevent tooth disengagement of the belt gear,
wherein:
the tensioner has an elastic member which is installed in the bracket unit, and has a curved body portion with an arc shape,
the bracket unit includes a first bracket installed at an upper end of the motor such that the rotation shaft penetrates the first bracket, and a second bracket having one end installed at an upper end of the first bracket and the other end installed at the gear shaft, and
the first bracket has a curved installation portion having a curved surface which corresponds to the curved body portion such that the elastic member is installed at the curved installation portion.

10. The actuator of claim 9, wherein both ends of the curved body portion are spaced apart from each other by a certain distance and are bent toward an outer surface of the belt gear; and
roll members installed at both ends of the elastic member, wherein the both ends of the elastic member are disposed in a slack side span and a tight side span, which are formed when the belt gear rotates.

11. The actuator of claim 10, wherein the tensioner is installed to rotate on the rotation shaft when the motor generates the torque.

12. The actuator of claim 11, wherein the tensioner rotates in the same direction as a rotation direction of the rotation shaft to press the belt gear in the slack side span.

13. The actuator of claim 9, wherein the first bracket has a deviation prevention protrusion spaced apart from the curved installation portion by a certain distance to prevent a deviation of the elastic member installed at the curved installation portion.

14. The actuator of claim 9, wherein the curved body portion is installed in an elastically deformed state such that an external diameter thereof is reduced by an extent by which the curved body portion overlaps the curved installation portion.

15. The actuator of claim 14, wherein, in a state in which the tensioner is installed in the first bracket, the roll members installed at the both ends of the elastic member are provided in a state of being pressed in a direction in which the roll members and an outer peripheral surface of the belt gear face each other.

16. The actuator of claim 9, wherein the first bracket has a first coupling portion protruding toward the second bracket and having a coupling groove formed therein in a lengthwise direction thereof, and
the second bracket has a second coupling portion provided at a position corresponding to the coupling groove so as to be inserted into the coupling groove.

17. The actuator of claim 9, wherein:
the belt driving device includes a driving gear coupled to the rotation shaft of the motor;
a driven gear coaxially coupled to the gear shaft of the gear device; and
the belt gear configured to transfer the torque from the driving gear to the driven gear.

18. The actuator of claim 17, wherein the driven gear includes a sun gear which is coaxially coupled to the gear shaft and rotates together with the driven gear to transfer the torque to the gear device.

\* \* \* \* \*